United States Patent
Colom

Patent Number: 6,082,426
Date of Patent: Jul. 4, 2000

[54] CROWN REINFORCEMENT FOR A TIRE

[75] Inventor: André Colom, Chamaliéres, France

[73] Assignee: Compagnie Generale des Etablissements Michelin - Michelin & Cie, Clermont-Ferrand Cedex, France

[21] Appl. No.: 09/125,464

[22] PCT Filed: Feb. 11, 1997

[86] PCT No.: PCT/EP97/00621

§ 371 Date: Aug. 19, 1998

§ 102(e) Date: Aug. 19, 1998

[87] PCT Pub. No.: WO97/30857

PCT Pub. Date: Aug. 28, 1997

[30] Foreign Application Priority Data

Feb. 20, 1996 [FR] France ................... 96 02178

[51] Int. Cl.⁷ .............. B60C 9/18; B60C 9/20; B60C 9/22; B60C 9/28

[52] U.S. Cl. ........... 152/527; 152/526; 152/531; 152/532; 152/534; 152/538

[58] Field of Search .................. 152/526, 527, 152/531, 532, 534, 538, 533

[56] References Cited

U.S. PATENT DOCUMENTS 3,703,202  11/1972  Maiocchi .
4,688,615  8/1987   Lee .
4,696,335  9/1987   Tsukagoshi et al. .

FOREIGN PATENT DOCUMENTS 2081872   12/1971  France .
5069702   3/1993   Japan .
WO9620095 7/1996   WIPO .

OTHER PUBLICATIONS

Abstract of JP 62–273 837 A, Nov. 27, 1987, Yokohama Rubber Co. Ltd.

*Primary Examiner*—Adrienne C. Johnstone
*Attorney, Agent, or Firm*—Baker Botts, L.L.P.

[57] ABSTRACT

A tire with radial carcass reinforcement 1, having a crown reinforcement 3 having at least two working crown plies 32, 34 made of inextensible cables, crossed from one ply to the other and forming angles of between 10° and 45° with the circumferential direction, characterized in that in the absence of any ply formed of inextensible cables forming an angle greater than 45° with the circumferential direction, an additional, axially continuous, ply 33 formed of metallic elements oriented substantially parallel to the circumferential direction, is placed radially between the working plies 32, 34, having an axial width $L_{33}$ at least equal to 1.05 times the axial width of the widest working crown ply $L_{32}$, $L_{34}$.

6 Claims, 1 Drawing Sheet

CROWN REINFORCEMENT FOR A TIRE

BACKGROUND OF THE INVENTION

The invention relates to a tire with radial carcass reinforcement anchored in each bead to at least one bead wire, and comprising a crown reinforcement formed by at least two so-called working plies, superposed and made of wires or cables which are parallel to each other in each ply and are crossed from one ply to the other, forming angles of at most 45° in absolute value with the circumferential direction of the tire.

French Application FR 94/15 736, which has not hitherto been published, relates to a tire as described above, and more particularly to a heavy truck tire, the ratio of the height above rim H to the maximum axial width S of which is at most 0.60. Said application, in order to improve the life of the crown reinforcement of such a tire, and also the regularity of wear of the tread thereof, requires an architecture of the crown reinforcement characterized by the combined presence in said reinforcement of an axially continuous ply formed of inextensible cables forming an angle of at least 60° with the circumferential direction of the tire, and a ply of metallic elements oriented substantially parallel to the circumferential direction, arranged radially between the two working crown plies.

U.S. Pat. No. 4,688,615 describes a crown reinforcement for a radial tire composed of a first ply and of a second ply formed by cables parallel to each other in each ply, crossed from one ply to the next, forming an angle with the circumferential direction of the tire that can range between 5 and 60°. A third ply of circumferentially arranged cables is placed between said two plies, said cables having a diameter at most equal to the diameter of the cables of the first and second plies, and being made of a material having a tensile strength less than the tensile strength of the material forming the cables of the first and second plies, which imparts a lower tensile strength to said third ply, and being more extensible than each of the plies with crossed cables, said third ply being no wider than the ply of cables with the widest angle.

The object of such an architecture is to reduce the operating temperatures prevailing at the edges of the working plies, the width of the additional ply of circumferential cables being less than the widths of the working plies.

Since the reduction of the operating temperatures in tires is also a major concern of the manufacturers of heavy truck tires, whatever the H/S form ratio, the Applicants' research has led them to look for a solution which is both effective and economic.

SUMMARY OF THE INVENTION

The tire with radial carcass reinforcement according to the invention, having a crown reinforcement comprising at least two working crown plies of inextensible cables, crossed from one ply to the other, forming angles of between 10° and 45° with the circumferential direction, is characterized in that, in the absence of any ply formed of inextensible cables forming an angle greater than 45° with the circumferential direction, an additional, axially continuous, ply formed of metallic elements oriented substantially parallel to the circumferential direction is placed radially between the working plies, has an axial width of at least 50% of the maximum axial width So of the carcass reinforcement, and at least equal to 1.05 times the axial width of the widest working crown ply, the metallic elements of the additional ply being cables having a greater diameter than the diameters of the cables of the working plies.

Preferably, the additional ply will have an axial width at least equal to 1.1 times the width of the widest working crown ply.

It has been noted that not only does the arrangement set forth and claimed permit a substantial gain in terms of operating temperature without requiring a so-called triangulation ply, but furthermore, unexpectedly, it permits an increase in the safety factor of the cables of the additional ply, the safety factor of a cable being the ratio of its breaking force under tension to the maximum tensile force to which it is subjected during operation in the travelling tire. At a constant safety factor, the weight and the cost of the additional ply can be advantageously reduced.

One advantageous manner of using the additional ply of circumferential elements, which is more particularly suitable for tires of H/S shape ratio of at least 0.70, consists in imparting to the first working crown ply a meridian curvature substantially equal to the meridian curvature of the subjacent carcass reinforcement, so as to be able to arrange it parallel to said carcass reinforcement without the interposition of profiled members. The additional ply is then provided with a substantially zero curvature, being separated from the first working ply by suitable profiled members, of substantially triangular shape.

"Inextensible cable" is to be understood to mean a cable, for instance a steel cable, which has a relative elongation of less than 0.5% measured at 25% of its breaking load.

Metallic elements oriented substantially parallel to the circumferential direction are elements which form angles within the range of $+2.5°$ to $-2.5°$ or around 0° with said direction.

The reinforcement elements of the additional ply may be inextensible metal cables imparting to said ply a very high rigidity of extension under tensile stress from the low elongations onwards. The rigidity of extension of the additional ply may be between 0.3 and 1.3 times the rigidity per unit length of a working ply of the crown reinforcement.

The rigidity of extension of a ply of reinforcing elements results from the tensile force exerted in the direction of said elements per unit of width of ply which is necessary to obtain a given relative elongation $\epsilon$, and may be expressed by the formula $R=(1/p)(dF/d\epsilon)$, R being the rigidity of the ply in question, p being the pitch between elements of said ply, and $(dF/d\epsilon)$ being the derivative of the tensile force per element in relation to the relative elongation.

In the above context, the additional ply may be formed of so-called semi- elastic continuous steel cables, that is to say cables having relative elongations upon rupture of between 2% and 6%. These cables make it possible to obtain the level of rigidity suitable for proper distribution of the circumferential tension between the working crown plies and the additional ply. Said cables are advantageously said to be "bimodular", that is to say, having a curve of tensile stress as a function of relative elongation having gradual slopes for the low elongations and a substantially constants steep slope for the higher elongations. The very low modulus before curing for elongations of less than 2% permits an increase in the Circumferential development of the additional ply during the curing of the tire.

The additional ply may also be formed of metal cables made of steel, oriented circumferentially and cut so as to form sections of a length very much less than the circumferential length of the ply, the cuts between sections being circumferentially offset relative to each other. Such an embodiment makes it possible, in simple manner, to impart the desired rigidity to the additional ply, said rigidity being less than the rigidity of a ply made with the same non-divided cables.

The crown reinforcement according to the invention will advantageously be finished off by a so-called protective crown ply, formed of elastic metal cables made of steel, oriented relative to the circumferential direction at an angle substantially equal to the angle formed by the cables of the radially outermost working crown ply, and the axial width of which is at least equal to the axial width of the radially outermost working ply.

DESCRIPTION OF THE DRAWING

The characteristics and advantages of the invention will be better understood with reference to the following description, which refers to the drawing, illustrating in non-limitative manner an example of an embodiment, and in which the single

DESCRIPTION OF PREFERRED EMBODIMENTS

Figure 1:
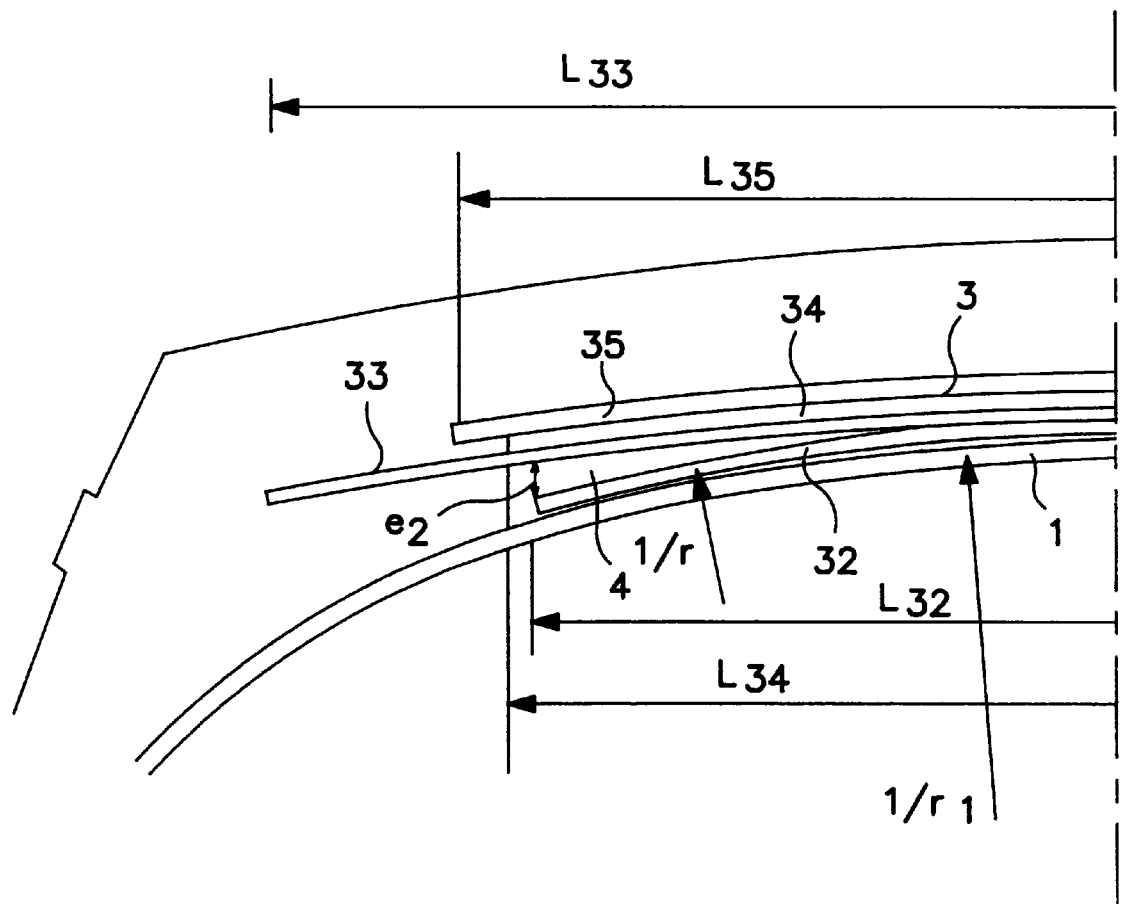
FIG. 1 shows a diagram, viewed in meridian section, of a crown reinforcement according to the invention.

The tire P, of dimension 315/80 R 22.5 X, has an H/S form ratio of 0.8. H being the height of the tire P on its mounting rim and S its maximum axial width. Said tire P comprises a radial carcass reinforcement 1 anchored in each bead to at least one bead wire, forming an upturn, and formed by a single ply of metal cables. This carcass reinforcement 1 is hooped by a crown reinforcement 3, formed radially from the inside to the outside by a first working crown ply 32 formed of inextensible metal cables made of steel and oriented by an angle a, equal in the case illustrated to 22°, radially adjacent and parallel to the carcass reinforcement 1, its meridian curvature 1/r being substantially equal to the meridian curvature 1/r, of the subjacent carcass reinforcement 1, the cables respectively of the carcass ply and of the working ply being separated by a constant thickness of rubber mix, surmounting the first working crown ply 32, by an additional ply 33 formed of inextensible metallic elements made of steel, of a circumferential length substantially equal to ⅙ of the circumferential length of the ply 33, said elements being oriented at 0°, the axially outer edges of the first working crown ply being separated from the additional ply 33 of circumferential elements by profiled members 4 of substantially triangular cross-section, the thickness $e_2$ of rubber between the ply 32 and the ply 33, measured at the axially outer end of the ply 32 and substantially equal to 2 mm, then by a second working crown ply 34 formed of metal cables identical to those of the first ply 32, and forming an angle β, opposed to the angle α and, in the case illustrated, equal to said angle α of 22° (but possibly being different from said angle α), with the circumferential direction, and finally by a final ply 35 of so-called elastic metal cables made of steel, oriented relative to the circumferential direction by an angle θ of the same direction as the angle β and equal to said angle β (but possibly being different), this last ply being a so-called protective ply, and so-called elastic cables being cables having a relative elongation of at least 4% upon rupture.

The width $L_{32}$ of the first working ply 32 is equal to 0.50 times the maximum axial width $S_0$ of the center section of the carcass reinforcement 1, namely 160 mm. which, for a tire of conventional shape, is very much less than the width of the tread, which is equal in the case in question to 235 mm. The axial width $L_{34}$ of the second working ply 34 is approximately equal to the width $L_{32}$. The axial width $L_{33}$ of the additional ply 33 is equal to 190 mm, which represents 0.6 $S_0$. In fact, the width $L_{33}$, of the additional ply 33 is very much greater than the width $L_{32}$ ($L_{34}$) of the widest working ply. The final crown ply 35, referred to as a protective ply, has a width $L_{35}$ which is very slightly greater than the width $L_{34}$ of the working crown plies, namely 165 mm.

The rigidity of extension of the working ply 32 or of the working ply 34, identical in the present case, since they are formed of the same non-hooped 9.28 metal cables made of steel which are inextensible and continuous over the entire width of the ply, said cables being arranged with the same pitch, that is to say with the same space between cables (measured perpendicular to said cables), is preferably greater than 4000 daN/mm at 0.5% relative elongation, and in the case in question equal to 5500 daN/mm. As for the additional ply 33, its rigidity of extension for a relative elongation of 0.5% is equal to 0.91 times that of a working crown ply, and in the case in question the ply 33 is formed of non-hooped 27.23 metal cables made of steel, cut so as to have sections of cables the circumferential length of which is equal to 17% of the circumferential length of the ply, which imparts thereto a rigidity of extension of 5000 daN/mm for a relative elongation of 0.5%.

The additional ply 33 may also be formed of so-called "bimodular" cables. Since a certain elasticity of the ply 33 is only useful during the shaping of the tire in the vulcanization mold, a cable having a low tangent modulus of extension, for example of at most 1000 daN/mm², from the origin to 1% relative elongation and a modulus of the same nature, for instance greater than 8000 daN/mm², for a relative elongation of more than 2%, can be used.

The tire described above in accordance with the second variant was tested under a load of 4000 kg for an inflation pressure of 8.5 bar and at a speed of 100 km/h. The measurements of temperature at the ends of the working crown plies show a gain in terms of operating temperature which may attain 25°, which is unexpected, given the high temperatures of above 100° reached in these regions.

I claim:

1. A tire with a radial carcass reinforcement (1), having a crown reinforcement (3) comprising two working crown plies (32, 34) of inextensible cables, crossed from one ply to the next, forming angles of between 10° and 45° with the circumferential direction and, in the absence of any ply made of inextensible cables forming an angle greater than 45° with the circumferential direction, an additional axially continuous ply (33) formed of metallic elements oriented substantially parallel to the circumferential direction, placed radially between the working plies (32, 34), having an axial width $L_{33}$ of at least 50% of the maximum axial width $S_0$ of the carcass reinforcement (1), the tire characterized in that the width $L_{33}$ of the additional ply (33) is at least equal to 1.05 times the axial width of the widest working crown ply $L_{32}$, $L_{34}$, the metallic elements of said additional ply (33) being cables having a diameter greater than the diameters of the cables of the working plies (32, 34).

2. A tire according to claim 1, characterised in that the width $L_{33}$ of the additional ply (33) is at least equal to 1.1 times the axial width of the widest working crown ply.

3. A tire according to claim 1, characterized in that the first radically innermost working crown ply (32) has a meridian curvature (1/r) substantially equal to the meridian curvature ($1/r_1$) of the subjacent carcass reinforcement (1), so that it is arranged parallel to said carcass reinforcement (1), profiled members 4 being interposed between the edges of the first working ply (32) and the additional ply (33), the curvature of which is substantially zero.

4. A tire according to claim 1, characterized in that the crown reinforcement (3) furthermore comprises a continuous protective ply (35), radially located above the last radially outermost working ply (34), formed of elastic metal cables, and the axial width $L_{35}$ of which is at least equal to the axial width $L_{34}$ of the radially outermost working ply.

5. A tire according to claim 1, characterized in that the cables of the additional ply (33) are inextensible metal cables made of steel, cut so as to form sections of a length very much less than the circumference of the ply, the cuts between sections being axially offset relative to each other.

6. A tire according to claim 1, characterized in that the cables of the additional ply (33) are continuous metal cables made of steel, having, before curing of the tire, a curve representing the tensile stress as a function of the relative elongation having gradual slopes for the low elongations and a substantially constant, steep slope for the higher elongations.

* * * * *